US008737378B2

(12) United States Patent
Mainaud et al.

(10) Patent No.: US 8,737,378 B2
(45) Date of Patent: May 27, 2014

(54) SYNCHRONIZATION OF NODES IN A NETWORK

(75) Inventors: Bastien Mainaud, Ris-Orangis (FR); Viet-Hung Nguyen, Saint-Mande (FR); Fabrice Monier, Bry sur Marne (FR); Jerome Bartier, Montrouge (FR)

(73) Assignee: Itron, Inc., Liberty Lake, WA (US)

( * ) Notice: Subject to any disclaimer, the term of this patent is extended or adjusted under 35 U.S.C. 154(b) by 121 days.

(21) Appl. No.: 13/365,128

(22) Filed: Feb. 2, 2012

(65) Prior Publication Data

US 2013/0107999 A1 May 2, 2013

Related U.S. Application Data

(63) Continuation of application No. PCT/US2012/023098, filed on Jan. 30, 2012.

(30) Foreign Application Priority Data

Oct. 31, 2011 (EP) ..................................... 11187341

(51) Int. Cl.
*H04J 3/06* (2006.01)

(52) U.S. Cl.
USPC ........... 370/350; 370/324; 370/477; 455/572; 455/574

(58) Field of Classification Search
CPC ..... H04W 84/18; H04W 8/005; H04W 48/12; H04W 56/00; H04W 40/005; H04W 40/10; H04W 40/22; H04W 40/248; G01D 4/004; G01D 4/006; G08C 19/16; G08C 17/02; G08C 2201/12; H04L 45/127
USPC ................. 370/217–218, 221, 225, 241–247, 370/250–252, 311, 328–334, 343–344, 457, 370/477, 324, 350; 709/208–211, 217–219, 709/228, 237, 242–244; 455/572, 574
See application file for complete search history.

(56) References Cited

U.S. PATENT DOCUMENTS

| 2004/0005902 A1 | 1/2004 | Belcea |
| 2008/0037431 A1 | 2/2008 | Werb et al. |

(Continued)

FOREIGN PATENT DOCUMENTS

| EP | 2244526 | 10/2010 |
| EP | 2381737 | 10/2011 |

(Continued)

OTHER PUBLICATIONS

Freaklabs—Open Source Wireless, IEEE 802.15.4 in the context of Zigbee—Part 2, Dec. 14, 2008, 8 pages.

(Continued)

*Primary Examiner* — Awet Haile
*Assistant Examiner* — Eric Myers
(74) *Attorney, Agent, or Firm* — Lee & Hayes, PLLC (57) ABSTRACT

Techniques for synchronization of clocks in nodes in a network are described. In one example, a node times or measures a synchronization timeout period. During the synchronization timeout period, the node may hear a beacon. In that event, the node may reset its clock using a time indicator found within the beacon. If the node does not hear a beacon before the end of the synchronization timeout period, the node may send a beacon request to one of its parents. In response, the parent node will broadcast a beacon, which may be heard by other nodes in the vicinity of the parent node. Upon receipt of the beacon and an included time indicator, the node will update its clock. Upon clock update, another synchronization timeout period is then started and the cycle is repeated, thereby maintaining synchronization of the clock with clocks of other nodes.

18 Claims, 5 Drawing Sheets

(56) References Cited

U.S. PATENT DOCUMENTS

| | | | |
|---|---|---|---|
| 2008/0089390 A1 | 4/2008 | Picard | |
| 2008/0095075 A1* | 4/2008 | Monier | 370/257 |
| 2009/0147714 A1 | 6/2009 | Jain et al. | |
| 2009/0290511 A1 | 11/2009 | Budampati et al. | |
| 2012/0178486 A1* | 7/2012 | Kaufmann | 455/515 |

FOREIGN PATENT DOCUMENTS

| | | |
|---|---|---|
| JP | 2005536919 | 12/2005 |
| JP | 2010087706 | 4/2010 |
| WO | WO2008033514 | 3/2008 |

OTHER PUBLICATIONS

Wireless Medium Access Control, IEEE 802.15.4, Speaker Chun-Yi Chen, Sep. 7, 2007, 40 pages.

The PCT Search Report for PCT application No. PCT/US12/23098, 11 pages.

The Extended European Search Report mailed Mar. 29, 2012 for European patent application No. 11187341.0, 6 pages.

* cited by examiner

SYNCHRONIZATION OF NODES IN A NETWORK

RELATED APPLICATIONS

This application is a continuation of, and claims priority to, PCT International Application No. PCT/US 12/23098, filed Jan. 30, 2012, which claims foreign priority to European Application No. 11187341.0, filed on Oct. 31, 2011, both of which are incorporated herein by reference.

BACKGROUND

A mesh network may include a number of nodes, each in communication with one or more other nodes in the network. Each node includes a radio, typically capable of transmission and reception. In some example networks, communication may utilize radio frequency (RF) signals spread over a plurality of "channels," with each channel defined over a particular range of frequencies.

It is possible that one channel may provide better reception than another channel. Accordingly, it may be advantageous for nodes in the network to sequentially tune one channel after another. This can be described as "channel hopping," and may be performed according to a time schedule. Because of the time schedule, synchronization between nodes is very important.

A classical solution to synchronization involves broadcast of a beacon frame that contains a timestamp. Nodes hearing the beacon will synchronize their clocks. However, the classical solution utilizes considerable network resources since, for example, leaf nodes will propagate (i.e., rebroadcast) the beacon despite the fact that they have no child nodes.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

The disclosure describes techniques for the synchronization of clocks in nodes in a network. In one example, a node defines, and then times or measures, a synchronization timeout period. During the synchronization timeout period, the node may hear a beacon, which may be transmitted on a control channel. In that event, the node may reset its clock, using a time indicator found in the beacon. However, if the node is busy transferring data on a channel other than the control channel, it may not receive a beacon transmitted on the control channel. If the node does not hear a beacon before the end of the synchronization timeout period, the node may send a beacon request to one or more of its parents. In response, the parent node(s) will broadcast a beacon, which may be heard by the node and other nodes in the vicinity of the parent node. Upon receipt, the node, and all other nodes receiving the beacon, will obtain a time indicator from the beacon, and update their clocks. Once the clock is updated, another synchronization timeout period is then started, and the cycle is repeated. Accordingly, the clock of the node is synchronized with clocks of other nodes, thereby allowing a plurality of nodes to channel hop in unison.

In a further example, a node may determine if it is a leaf node. If it is a leaf node, this information may be used in one or more network protocol layers. In one example, a leaf classification function sets a timer for a leaf-indicating period of time. If no beacon request is received by the node within the period of time, then the node may determine that it has no children and is, therefore, a leaf node.

In a further example implementation, the synchronization timeout period may be adjusted for one or more nodes. For example, a synchronization timeout period of a leaf node may be set to be slightly longer than a synchronization timeout period of a parent node of the leaf node. The shorter synchronization timeout period of the parent may result in transmission of a beacon request by the parent, and a resulting beacon broadcast to the parent. The leaf node may receive the same beacon as the parent, before its synchronization timeout period expires, and is therefore freed from the need to send a beacon request. This reduces network traffic under some network configurations.

The discussion herein includes several sections. Each section is intended to be non-limiting. More particularly, this entire description is intended to illustrate components which may be utilized in synchronizing clocks in nodes in a network, but not components which are necessarily required. The discussion begins with a section entitled "Example Network," which describes one environment that may implement the techniques described herein. This section depicts and describes an example high-level network architecture. Next, a section entitled "Example Node" illustrates and describes an example of components, functionality and/or techniques that may be included in a node. A further section, entitled "Example Processes" illustrates and describes techniques that may be used in the operation of a network and/or node. Sections addressing "Example Synchronization Processes," "Example Leaf-Identification Processes" and "Example Synchronization timeout period Adjustment Processes" provide examples of several possible node and network operations. Finally, the discussion ends with a brief conclusion.

This brief introduction, including section titles and corresponding summaries, is provided for the reader's convenience and is not intended to describe and/or limit the scope of the claims or any section of this disclosure. Thus, the "techniques" discussed herein may refer to device(s), system(s), method(s) and/or computer-readable instructions as permitted by the context above and throughout the document.

Example Network

Figure 1:
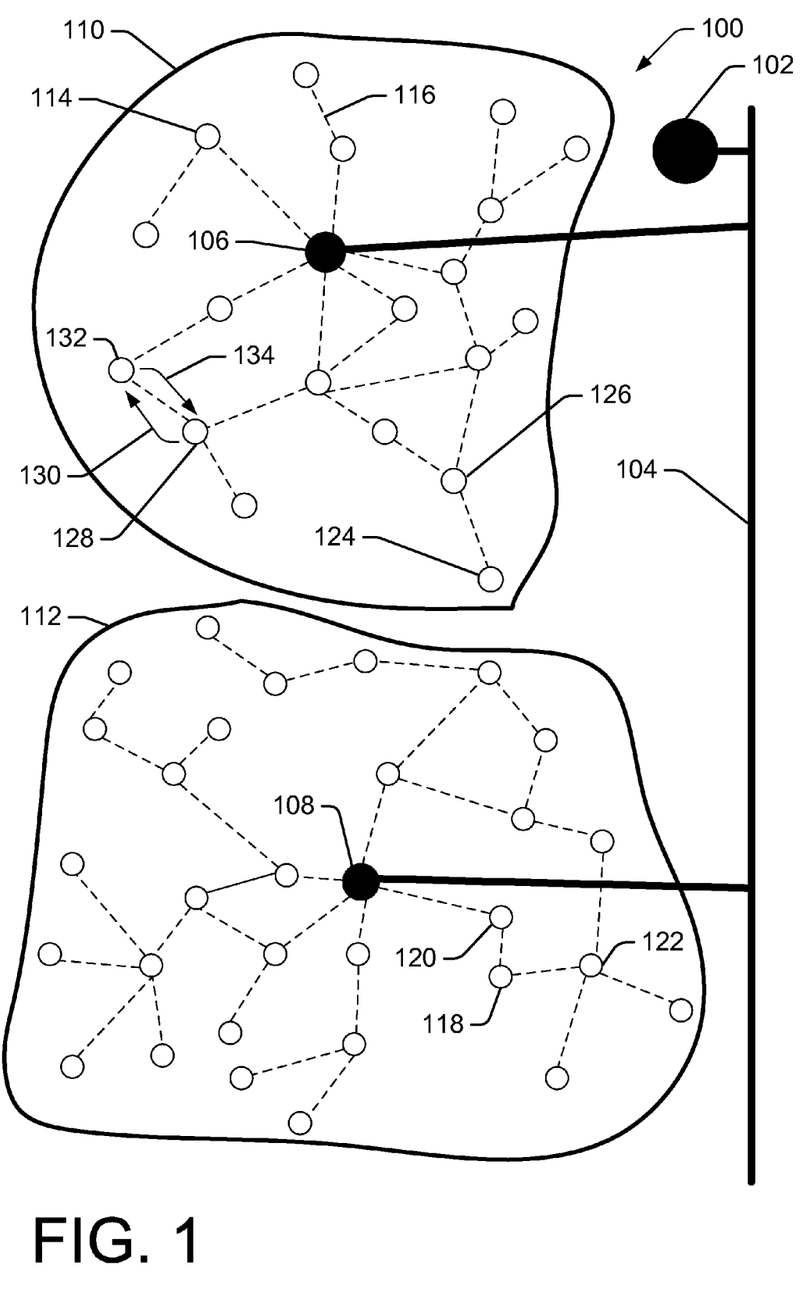
FIG. 1 is diagram showing an example of a portion of a network, including a plurality of nodes, cellular routers and a clock server.

FIG. 1 is a diagram showing a high-level view of a network 100 and is provided as an example environment in which synchronization of clocks of nodes in a network may be performed. The network 100 may be wireless in nature, and may include radio frequency (RF) communication signals.

The network 100 is intended to provide a specific implementation and to illustrate general concepts, but is not intended to indicate required and/or necessary elements. In one example, the network 100 includes a plurality of nodes. The nodes may include utility meters, such as meters measuring consumption of electricity, natural gas and/or water. The nodes may additionally or alternately include cellular routers, transformers, endpoints, connections to the Internet, servers and other network elements. Moreover, although the disclosed material has application in the Smart Grid and advanced metering infrastructure (AMI) networks, the concepts are also applicable in more general communication networks.

In one example, the network 100 may include a clock server 102 to provide a clock signal to devices on the network. The clock server 102 may obtain time information from any desired source, such as the global positioning system (GPS), or radio broadcasts at 60 kHz (USA or UK), 77.5 kHz (Germany/Europe), 40 or 60 kHz (Japan) and/or 68.5 kHz (China). The clock server 102 may communicate with devices on the network by means of a wide area network (WAN) 104 or alternative structure providing wired or wireless network connectivity. One or more cellular routers 106, 108 may be used to provide wireless connectivity to a remote server (not shown). The remote server may be located in a corporate office, computing facility or other location. Each cellular router 106, 108 is associated with a cell 110, 112 (shown within a defining perimeter). In each cell, a number of nodes may define a "mesh" network. Nodes in the mesh network obtain and transmit data (e.g., in their capacity as utility meters or other network communication devices), and also serve as routers for other nodes. In particular, the mesh network in each region 110, 112 includes a plurality of nodes which collaborate to propagate the data through the network. In the example of FIG. 1, the mesh networks in cells 110, 112 may each include a plurality of nodes, which collectively propagate data to the cellular routers 106, 108 for transmission to a remote server, such as at a head end or central office.

One or more nodes 114 may be located in each mesh network. The nodes may be any type of network devices, some of which may also have other functionality. For example, nodes 114 may include utility consumption-measuring meters, such as electric, gas and/or water meters. Additionally or alternatively, one or more nodes may also function as transformers, substations, anti-theft devices or any other devices present in a smart electrical grid.

Each node 114 may be configured for two-way communication with one or more other nodes. In the example of FIG. 1, the communication is by means of one or more wireless radio frequency (RF) link(s) 116. The RF links 116 allow each node to communicate with at least one other node in the mesh network.

Many of the nodes in the mesh network of each cell 110, 112 may be both a parent node and a child node. For example, node 118 is a child with respect to node 120, and is a parent with respect to node 122. Generally, the parent nodes are closer to the cellular routers 106, 108, while the child nodes are further from the cellular routers. Note that information, such as consumption data from utility meters, is generally propagated from the nodes to the cellular routers, which transfer the information to the home office, computing facility and/or a server.

A leaf node 124 is a child node that is not also a parent node. Thus, a leaf node 124 has a parent node 126, but no child node. Identification of leaf nodes is important in certain operations and on different network protocol layers. In one example, a leaf node 124 does not need to provide a beacon containing a time indicator for clock update, because there are no downstream nodes (nodes further from, or more hops from, the cellular router) requiring such a beacon. Thus, identification of a node as a leaf node will reduce network traffic, by preventing such beacons.

If a node, e.g. node 128 in FIG. 1, experiences interference in reception or is busy on a channel other than a control channel when a beacon is transmitted, it may fail to hear the beacon and fail to obtain the time indicator in the beacon. Accordingly, at the conclusion of a synchronization timeout period, the node 128 may send a beacon request 130 to a parent node 132. In response, the parent node 132 may respond with a beacon 134. The beacon may be generated from information including input from a clock on the parent node 132.

Example Node

Figure 2:
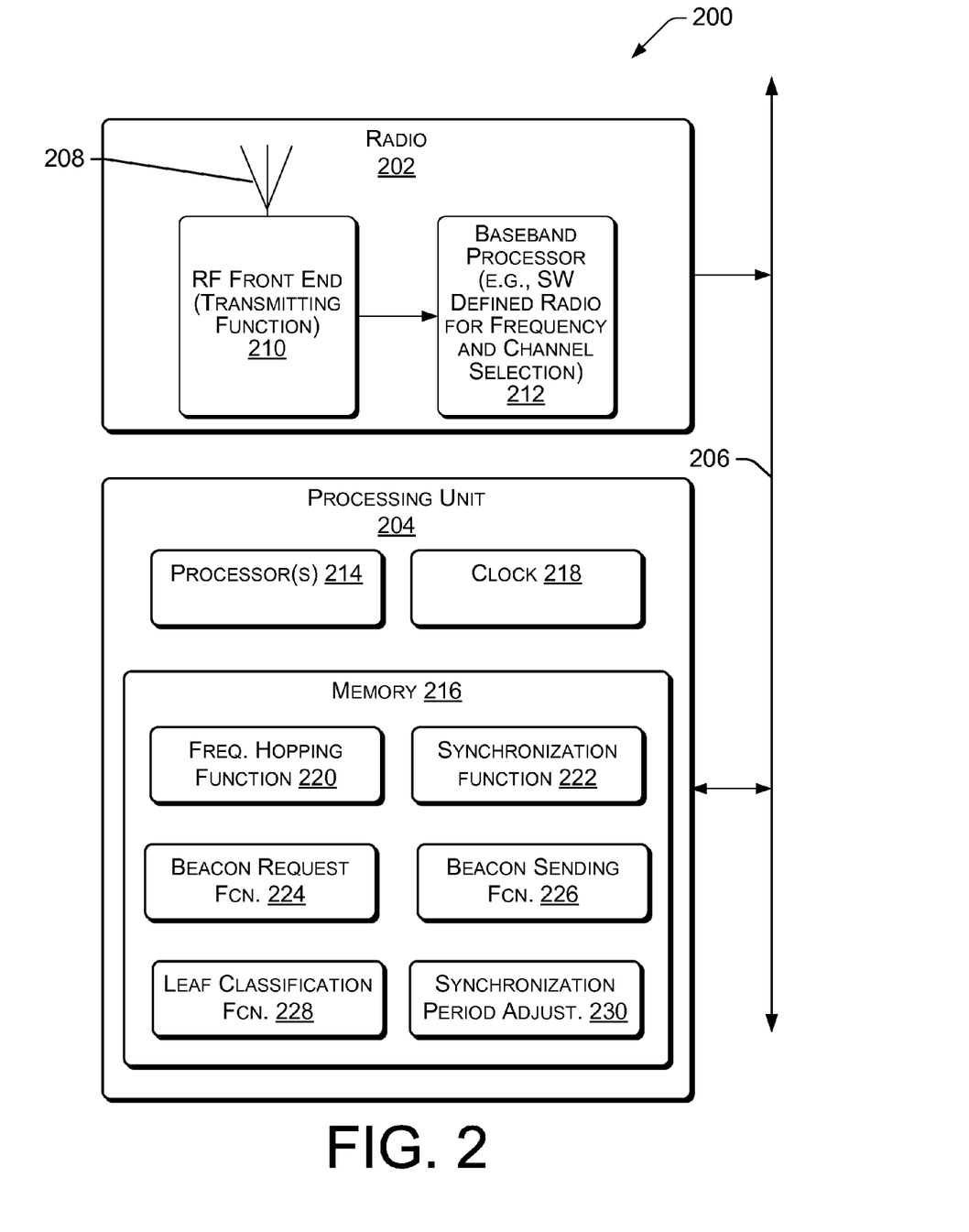
FIG. 2 is a diagram showing an example of a node, including a radio and a processing unit.

FIG. 2 is a diagram showing an example of a node 200. In one example, the node 200 may be implemented as any one of a variety of conventional computing devices and advanced metering infrastructure (AMI) devices such as, for example, smart utility meters (e.g., electric, gas, and/or water meters equipped for two-way communications), sensors (e.g., temperature sensors, weather stations, frequency sensors, etc.), control devices, regulators, routers, servers, relays, switches, valves, or a combination thereof In one specific example, nodes may comprise network routers, sometimes referred to as a "smart grid router," disposed at a cellular router station (e.g., atop a utility pole).

In the example of FIG. 2, the node 200 may include a radio 202 and a processing unit 204 in communication over a bus 206. In one example, the radio 202 includes an antenna 208 providing input to a radio frequency (RF) front end 210. The RF front end 210 may provide transmitting and receiving functions. The RF front end 210 may include high-frequency analog and/or hardware components that provide functionality such as tuning and attenuating signals provided by the antenna 208 and obtained from nodes in the network. As output, the RF front end 210 may provide data that is generally in the form of an analog or digitized baseband signal sent to a baseband processor 212. A particular case, not to be construed as a typical and/or limiting case, the output of the RF front end 210 may include a stream of one's and zero's representing data and/or packet(s)

All or part of the baseband processor 212 may be configured as a software (SW) defined radio. In one example, the baseband processor 212 provides frequency and/or channel selection functionality to the radio 202. The software-defined radio may include components that might alternatively be implemented using analog components. For example, the SW defined radio may include mixers, filters, amplifiers, modulators and/or demodulators, detectors, etc., implemented in software executed by a processor or application specific integrated circuit (ASIC) or other embedded computing device(s). The software-defined radio may utilize processor 214 and software defined or stored in memory 216. Accordingly, a balance may be made between functionality performed by the RF front end 210 and functionality performed by the baseband processor 212, which may include a software defined radio.

The processing unit 204 may include one or more processors 214 in communication with one or more memory devices 216. A clock 218 may be configured to maintain the time of day. The clock may also be configured to provide one or more count-up or count-down timers. Such timers may be used to time a synchronization timeout period, a leaf-indicating period, periods used in frequency hopping and/or the like.

A frequency hopping function 220 may be configured to communicate with the baseband processor 212 and the clock 218. In one example, the frequency hopping function 220 is configured to obtain time information and/or set frequency-hopping timers in the clock. Such time information and/or timers will indicate to the frequency hopping function 220 when to "hop" or tune a different channel or frequency. Additionally, the frequency hopping function 220 may be configured to direct the SW defined radio or other construct in the baseband processor 212 to perform the actual frequency changes. Accordingly, the frequency hopping function 220 is able to repeatedly shift between agreed upon frequencies, at agreed upon times and communicate with another node(s) for agreed upon periods of time and in agreed upon protocols.

A synchronization function 222 is configured to synchronize the clock 218 with at least one other clock. In one example, the synchronization function 220 synchronizes the clock 218 of the node 200 to the clock or time server 102 (see FIG. 1). The synchronization may be made directly or indirectly, such as through a chain of nodes. Because other nodes in the network 100 (see FIG. 1) also synchronize to the clock server 102, the clocks of a plurality of nodes in the network are synchronized. This is advantageous at least because the frequency hopping function 220 is able to obtain correct time information and timely hop or tune a desired frequency.

In operation, the synchronization function 222 may set or define a synchronization timeout period, which may be timed by the clock in a count-up or count-down manner. If, during the synchronization timeout period, a beacon is received, a time indicator from the beacon may be used to reset and/or correct the time of day indicated by the clock. Accordingly, crystal drift and/or other factors contributing to inaccuracy of the clock may be corrected. However, if the synchronization timeout period ends without receipt of a beacon, the synchronization function 222 may activate a beacon request function 224, which requests that a parent node of the node 200 send a beacon to the node 200. Upon receipt of that beacon, the clock is similarly corrected.

If the node 200 is a parent node (i.e., not a "leaf" node), it may receive beacon request(s) from one or more of its children nodes. Accordingly, a beacon sending function 226 is configured to read the clock 218 and construct a beacon with appropriate time indicator information. The beacon may be configured as a packet having the time indicator information, which is then broadcast to the child node which requested the beacon. Additionally, the broadcast may be received by other nodes in the vicinity of the node 200.

A leaf classification function 228 is configured to determine if the node 200 is a leaf. A leaf is a node that has no associated child node. Various functions undertaken by various protocol layers require and/or benefit from knowing whether a node is a leaf In one example, a determination that a node is a leaf node allows that node to abstain from sending beacons with time indicators, because other nodes are better served getting their beacons from their parent node(s).

In operation, the leaf classification function 228 may use the clock to time a leaf-indicating period of time. This period of time may be selected so that, if upon conclusion of the period, the node has not received a beacon request, then it is likely that the node is actually a leaf That is, because the node failed to receive a beacon request, and because such requests are directed at parent nodes, it is probable that the node is not a parent, and is therefore a leaf.

In one example embodiment, a synchronization timeout period adjustment function 230 may be included in the processing unit 204. In some example applications, network traffic can be reduced somewhat if different nodes have synchronization timeout periods of different length. The synchronization timeout period is the period of time after which, if a beacon has not been received, a beacon request must be sent. The synchronization timeout period adjustment function 230 may alter the synchronization timeout period of the node. For example, if the node is known to be a leaf node, a slight extension of the synchronization timeout period may be desirable. Due to the slight extension, the leaf node's parent node may reach the end of its synchronization timeout period and send a beacon request, prior to expiration of the synchronization timeout period of the leaf. The resulting beacon, which may be heard by both the parent node and the leaf node, may arrive prior to the expiration of the synchronization timeout period of the leaf Accordingly, the slightly longer synchronization timeout period of the leaf may result in fewer beacon requests, fewer beacons and generally less network traffic.

Example Processes

The example processes of FIGS. 3-6 can be understood in part by reference to the configurations of FIGS. 1-2. However, FIGS. 3-6 contain general applicability, and are not limited by other drawing figures and/or prior discussion.

Each process described herein is illustrated as a collection of acts, blocks or operations in a logical flow graph, which represent a sequence of operations that can be implemented in hardware, software, or a combination thereof The processes may include storing, in a memory communicatively coupled to a processor, computer-executable instructions for performing a method, such as a method of synchronizing clocks in nodes in a network, and then executing the instructions on the processor.

In the context of software, the operations represent computer-executable instructions stored on one or more computer-readable media or computer-readable storage media that, when executed by one or more processors, perform the recited operations. Such computer-readable media, processors and computer-readable instructions can be located in a system (e.g., node 200 of FIG. 2) according to a desired design or implementation. The memory 216 seen in FIG. 2 is representative of computer-readable media generally, both removable and non-removable, and of any technology. Thus, the recited operations represent actions, such as those described in FIGS. 3-6, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

Computer-readable media includes volatile and non-volatile, removable and non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Any such computer-readable media may be part of the system 200.

Moreover, the computer-readable media may include computer-executable instructions that, when executed by the processor(s) 214, perform various functions and/or operations described herein.

Additionally, for purposes herein, a computer-readable media may include all or part of an application specific integrated circuit (ASIC) or other hardware device. Such a hardware device may be configured to include other functionality, including functions performed in synchronizing nodes in a network. Accordingly, in such an integrated circuit, one or more processors are configured with executable instructions, which may be defined by logic, transistors or other components, or on-board memory.

In contrast, communication media may include a modulated data signal or other transitory media or signal. As defined herein, computer storage media does not include communication media and/or carrier waves or data signals.

Example Synchronization Processes

Figure 3:
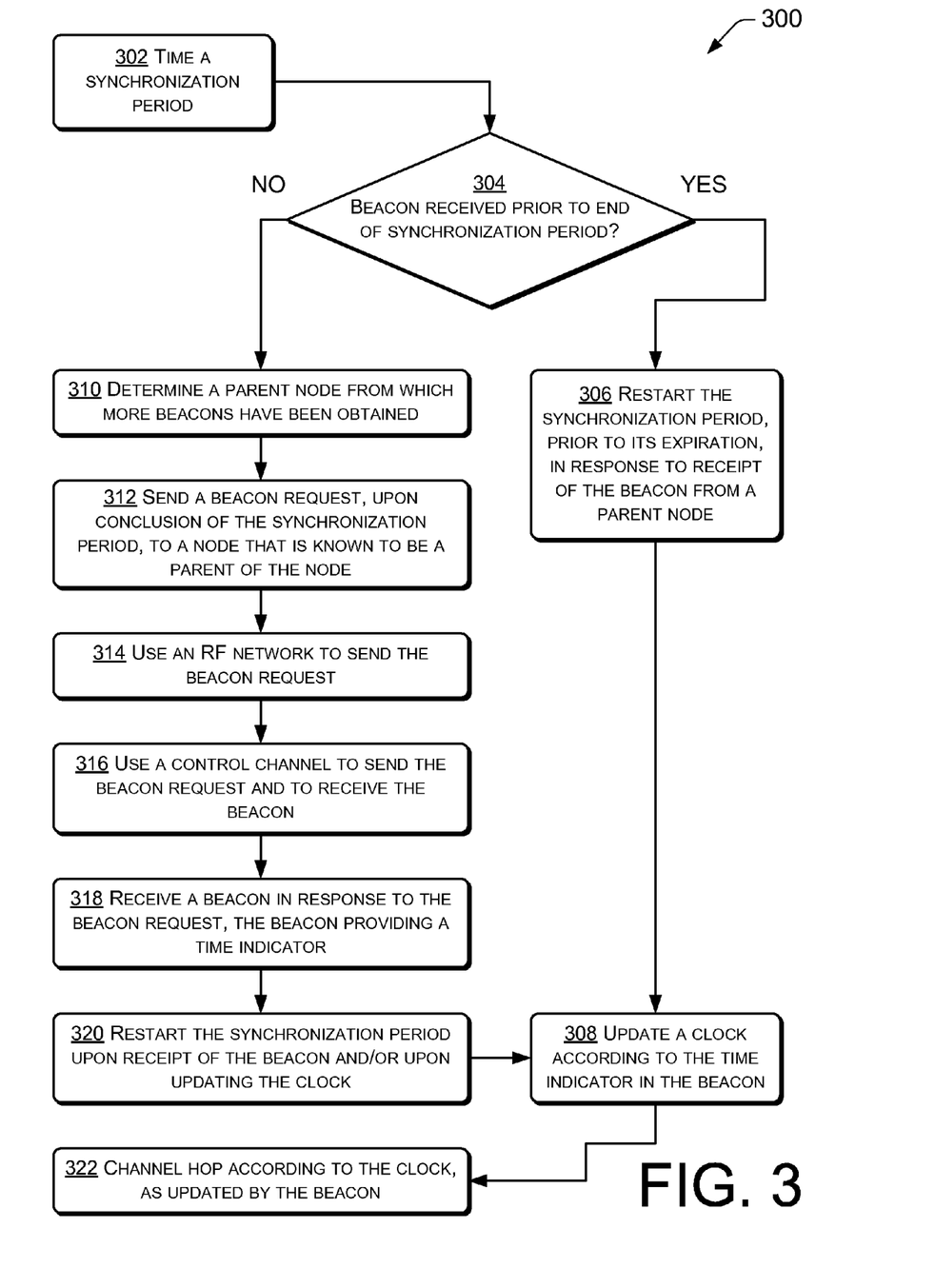
FIG. 3 is a flow diagram illustrating an example method by which clocks in nodes may be synchronized in a network.

FIG. 3 is a flow diagram illustrating an example process 300 by which clocks of nodes in a network may be synchronized. In one example, the process 300 may be performed by a node or other device on a network, or in a network environment. The process may include transmission of a beacon request and receipt of a beacon, which may include a time indicator. Such a beacon may be broadcast by a parent node, a cellular router or a time server.

The process may determine if a beacon, used to update and thereby synchronize the clock of a node in a network, has been received during a synchronization timeout period. In some instances, a node will not receive a beacon due to radio interference and/or time spent communicating on channels other than the control channel. If a beacon is not received, then a beacon request may be sent to a parent of the node, and a beacon is broadcast in response. Upon receipt of the beacon, whether prompted by a beacon request or not, a time indicator from the beacon is utilized to adjust and thereby synchronize the clock in the node. Accordingly, the clock of the node is synchronized with respect to the clocks of other nodes. This is advantageous in network operations, such as frequency hopping, wherein nodes tune a particular sequence of frequencies or channels at particular times.

FIG. 3 shows that at operation 302, a synchronization timeout period is timed. In one example, the clock of the node is used to count up or count down to thereby time or measure a synchronization timeout period. The synchronization timeout period may be a period of time in the range of 1 to 2 hours. However, significant departures from this range may be utilized as the synchronization timeout period.

At operation 304, a determination is made if a beacon was received prior to the end of the synchronization timeout period. In an RF network environment, it is common for a node to "overhear" a beacon broadcast by another node in the general vicinity. Such a beacon may have been sent in response to a beacon request of a still further node. Thus, a beacon requested by a requesting node and broadcast by a sending node may be heard by a plurality of nodes in the vicinity of the sending node. Accordingly, the determination of whether a beacon was received prior to the end of the synchronization timeout period may be related to whether a node in the vicinity of the node transmitted a beacon, perhaps requested by another node, during the synchronization timeout period. In the example implementation of FIG. 2, the synchronization function 222 may utilize the clock 218 to perform the operation 304. Thus, the synchronization function 222 may watch for the incoming beacon, and coordinate with the clock to make the determination of whether the beacon arrived prior to the end of the synchronization timeout period.

At operation 306, if a beacon was received during the synchronization timeout period, the synchronization timeout period may be restarted upon receipt of the received beacon or upon correction of the clock using information from the beacon. That is, the timing of the synchronization timeout period is begun again, even though the earlier synchronization timeout period was not completed. Thus, the synchronization timeout period may be a measure of time that has elapsed since a beacon was received. Similarly, the synchronization timeout period may be an alarm set to indicate when a prescribed period of time has elapsed since a last beacon was received. In the example of FIG. 2, the synchronization function 222 may restart the synchronization timeout period upon receipt of the beacon. The synchronization timeout period may be measured by operation of timers associated with the clock 218.

At operation 308, upon receipt of the beacon, a clock in the node is updated according to the time indicator in the beacon. Thus, the time indicator in the beacon may provide a correction to the clock, which may have experienced a slight discrepancy from actual time due to crystal drift or other factors. In the example of FIG. 2, the synchronization function 222 may use the time indicator in the beacon to adjust the time of the clock 218.

At operation 310, in the event that a beacon was not received prior to expiration of the synchronization timeout period, a beacon request may be sent. As a step in sending the beacon request, it may be determined from which parent node more beacons have been obtained by the node. Thus, if a node has more than one parent node, it may be helpful to send the beacon request to the node from which a beacon is typically received. This may cut down network traffic by avoiding transmission of beacon requests that are directed to nodes that are less likely to comply or whose beacons are less likely to be received. In the example of FIG. 2, the beacon request function 224 may be configured to determine an appropriate parent node to which to send the beacon request, possibly taking into account which parent node has historically provided the most beacons. For example, if a parent node frequently or typically provides beacons that are overheard prior to expiration of the synchronization timeout period, then the beacon request may be addressed to that parent node.

At operation 312, a beacon request is sent, triggered by failure to hear a beacon during the synchronization timeout period. In one example, the beacon request may be sent to a known parent of the node. In an alternative example, the beacon request may be broadcast in a more general manner, such as to any available node. At operation 314, in one example, an RF network is used to send the beacon request. In an alternative network environment, the beacon request could alternatively be sent over a wired or other network. At operation 316, in a further example, a control channel (i.e., a frequency range designated as a control channel) can be used to send the beacon request and/or to receive the beacon.

At operation 318, a beacon is received in response to the beacon request. The beacon may include a time indicator, which may be used to update a time indicated by the clock. Accordingly, the clock becomes synchronized to other clocks in other nodes of the network. In the example of FIG. 2, the synchronization function 222, or alternate function, may update the clock 218 in response to receipt of the beacon.

At operation 320, the synchronization timeout period is restarted upon receipt of the beacon and/or upon updating the clock. In the example of FIG. 2, the synchronization function 222 may restart the synchronization timeout period in response to receipt of the beacon and/or updating of the clock 218.

At operation 308, upon receipt of the beacon, the clock may be updated. Update of the clock may be performed by the synchronization function 222 or the like. Update of the clock may trigger a restart of the synchronization timeout period, if not previously restarted by receipt of beacon.

At operation 322, the node may continue to perform functions that require accurate knowledge of time, such as channel hopping. Channel hopping (e.g., sequential changes in frequencies tuned in a timed manner) may be performed according to the updated clock. Accordingly, nodes with updated and/or synchronized clocks are able to tune frequencies in synchronized manner.

Figure 4:
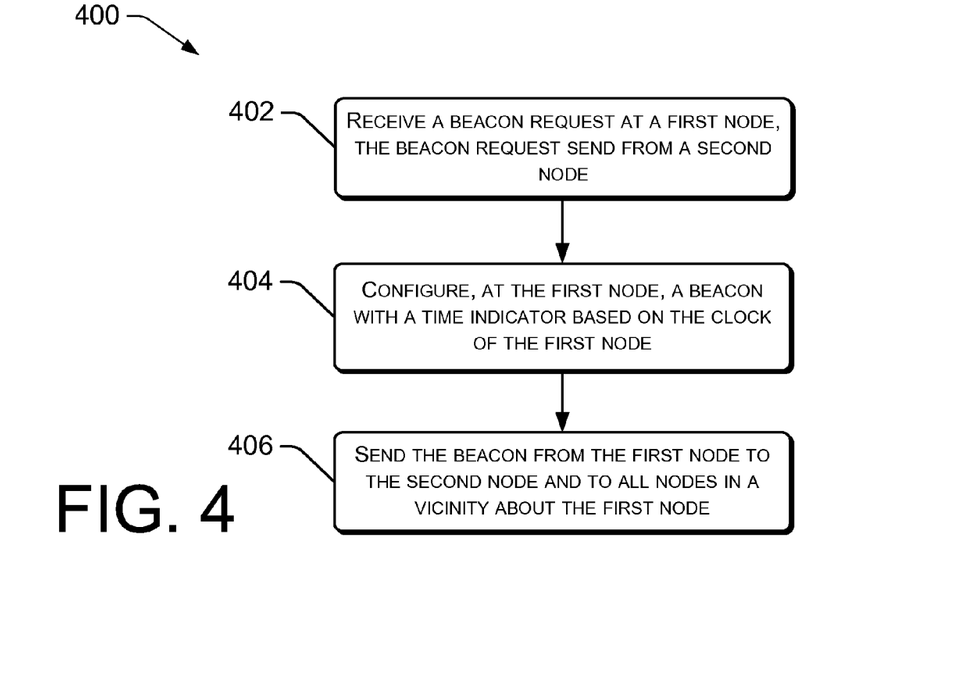
FIG. 4 is a flow diagram illustrating an example method by which a parent node may provide a beacon to a child node.

FIG. 4 is a flow diagram illustrating an example process 400 by which a beacon request may be serviced. Accordingly, while FIG. 3 described an example by which a child node could obtain a beacon, FIG. 4 describes an example by which a parent node may provide such a beacon.

FIG. 4 shows that at operation 402 a beacon request is received at the parent node. The beacon request may have been sent by a child node of the parent. In the example of FIG. 1, the node 118 may receive a beacon request from its child node 122.

At operation 404, a beacon is configured for transmission to the child node, typically including a time indicator or data structure indicating a current time. The time indicator may be based on the clock of the node receiving the beacon request.

At operation 406, the parent node sends the beacon to the child node. Since transmission of the beacon may be done by RF, all nodes in the vicinity about the parent node may opportunistically receive the beacon.

Example Leaf-Identification Processes

Figure 5:
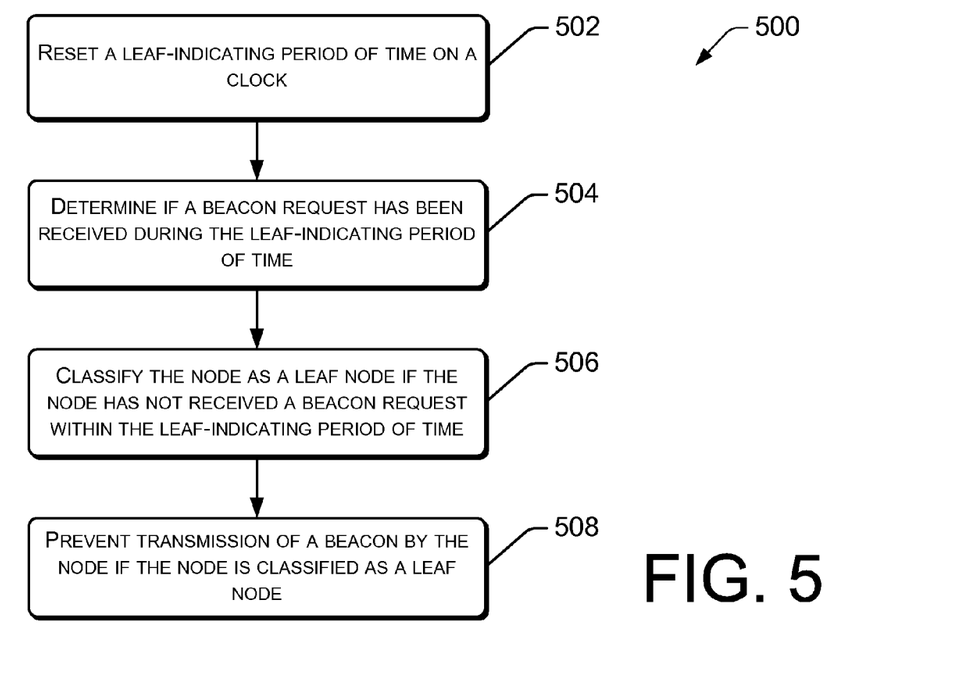
FIG. 5 is a flow diagram illustrating an example method by which a node may determine that it is a leaf node.

FIG. 5 is a flow diagram illustrating an example process 500 by which a node may determine if it is a leaf A leaf is a node that is not a parent node. Knowledge that a node is a leaf is helpful in synchronization of the network, in that leaf nodes may be configured to refrain from broadcasting beacons, and to thereby reduce network traffic. Also, knowledge that a node is a leaf can be advantageous in the operation of various layers of network protocols. In one example, a node may determine that it is a leaf if, over a sufficient period of time, it does not receive a beacon request. Since parent nodes receive beacon requests, and leaf nodes do not have children, failure to receive a beacon request is characteristic of a leaf. Thus, having not received a beacon request over time, the node may become progressively more certain that it is a leaf.

FIG. 5 shows that at operation 502 a timer is set or reset for a leaf-indicating period of time. The leaf-indicating period of time may be selected to provide a desired certainty that the node is actually a leaf A longer period of time provides greater certainty, while a shorter period of time may provide the benefits of the knowledge of leaf status sooner. A balance of the competing factors may be adjusted to suit the application, and the time set. In the example of FIG. 2, the leaf classification function 228 may be used by a node to determine if it is a leaf.

At operation 504, it is determined if a beacon request has been received during the leaf-indicating period of time. At operation 506, a node may classify itself and/or be classified as a leaf or not, depending on if a beacon request was received during the leaf-indicating period of time. Failure to receive a beacon request indicates that the node is probably a leaf. At operation 508, if the node has been found to be a leaf, it is prevented from transmitting a beacon. Accordingly, network bandwidth is preserved.

Example Synchronization Timeout period Adjustment Processes

Figure 6:
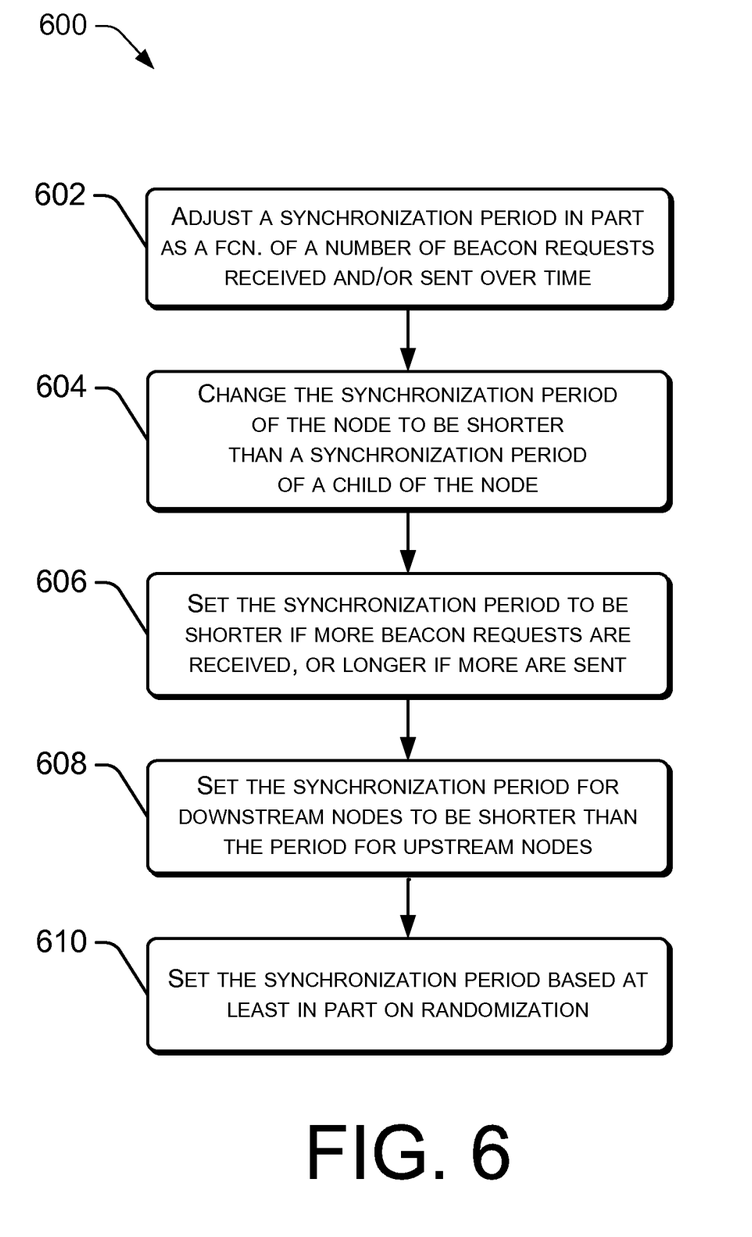
FIG. 6 is a flow diagram illustrating an example method by which a synchronization timeout period may be adjusted.

FIG. 6 is a flow diagram illustrating an example of a process 600 by which the synchronization timeout period may be adjusted in one or more nodes in the network. The synchronization timeout period is the time period during which a node waits to hear a beacon. If, after passage of the synchronization timeout period, the node had not heard a beacon, then the node will send a beacon request to a parent node. In an example implementation, the synchronization timeout period may be different for different nodes. The length of the synchronization period may be based on a position of the node within the mesh network. Alternatively or additionally, the synchronization timeout period may be based at least in part on randomization, so that different nodes have different synchronization timeout periods. In operation, a slightly longer synchronization timeout period for a leaf node may mean that it will be more likely to hear a beacon intended for its parent before expiration of its synchronization timeout period. In such a circumstance, the leaf node will more rarely transmit a beacon request, thereby reducing network traffic. Accordingly, FIG. 6 shows factors that, singly and in combination, can be used to adjust a synchronization timeout period of a node, and to advantageously reduce network traffic. In the example of FIG. 2, the synchronization timeout period adjustment function 230 may be used to adjust a synchronization timeout period of a node.

FIG. 6 shows that at operation 602 a synchronization timeout period is adjusted in part as a function of a number of beacon requests received and/or sent over time. In this example operation, a large number of beacon requests may indicate that the node is a parent to a number of other nodes. The beacon requests it receives from its child nodes uses network bandwidth. This bandwidth may be reduced in some instances by shortening the synchronization timeout period of the node. This may cause the node to request a beacon before it would otherwise do so. The resulting beacon may be heard by one or more of the child nodes, thereby preventing them from sending a beacon request.

At operation 604, the synchronization timeout period of the node may be adjusted to be shorter than a synchronization timeout period of a child of the node. In a manner similar to that seen above, a parent node with a shorter synchronization timeout period may perform a beacon request, resulting in a beacon that is heard by both the beacon and its child. Thus, the child does not send a beacon request, and network bandwidth is conserved.

At operation 606, the node may set its synchronization timeout period to be shorter if more beacon requests are received than are sent, or longer if more beacon requests are sent than are received. Thus, both parent and child nodes may attempt to adjust their synchronization timeout periods to reduce the number of beacon requests, and therefore the amount of network traffic.

At operation 608, the synchronization timeout period for upstream nodes (nodes closer to, or fewer hops from, the cellular router) is set to be shorter than downstream nodes (nodes further from, or more hops from, the cellular router). In particular, a downstream node, such as a leaf node, may be configured with a slightly longer synchronization timeout period. This gives such a leaf a slightly longer period of time to hear a beacon, such as a beacon directed to its parent.

Because the downstream node heard a beacon, it will not send a beacon request, which reduces network traffic.

At operation 610, the synchronization timeout period of the node may be set based at least in part on randomization.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating a node, comprising:
   timing a synchronization timeout period on a clock of the node, wherein a duration of the synchronization timeout period is set at least in part as a function of:
      a number of beacon requests received over a period of time; and
      a number of beacon requests sent over the period of time;
   listening for a beacon during the synchronization timeout period, the listening including reception of radio frequency (RF) signals on a control channel defined in a mesh network;
   sending a beacon request, upon a conclusion of the synchronization timeout period and when no beacon has been received, the sending including RF transmission on the control channel of a packet addressed to a parent of the node;
   receiving a beacon from the parent, in response to the beacon request, the beacon providing a time indicator;
   updating the clock of the node according to the time indicator;
   restarting the synchronization timeout period; and
   classifying the node as a leaf node when the node has not received a beacon request in a leaf-indicating period of time measured by the clock.

2. The method as recited in claim 1, additionally comprising:
   receiving a beacon request from a second node;
   configuring a second beacon with a second time indicator based on the clock of the node; and
   sending the second beacon to the second node.

3. The method as recited in claim 1, wherein sending the beacon request comprises:
   determining a node from which more beacons have been obtained; and
   sending the beacon request to the determined node.

4. The method as recited in claim 1, wherein a duration of the synchronization timeout period of the node is adjusted based on a position of the node within the mesh network.

5. The method as recited in claim 1, wherein a duration of the synchronization timeout period of the node is based in part on randomization.

6. The method as recited in claim 1, wherein a duration of the synchronization timeout period of the node is adjusted based in part on a position of the node within the mesh network and based in part on randomization.

7. The method as recited in claim 1, additionally comprising: listening for beacon requests from children of the node during the leaf-indicating period of time.

8. The method as recited in claim 1, additionally comprising: listening for a beacon request during the leaf-indicating period of time, the listening including reception of RF signals on the control channel defined in the mesh network.

9. A node, comprising:
   a processor;
   a memory, in communication with the processor;
   a clock, in communication with the processor;
   a synchronization function, defined in the memory and executable by the processor, the synchronization function configured to measure a synchronization timeout period using the clock;
   a beacon request function, defined in the memory and executable by the processor, the beacon request function configured to:
      generate a beacon request in response to a conclusion of the synchronization timeout period without receipt of a beacon, wherein the clock is configured to be updated according to a time indicator in a beacon received in response to the beacon request; and
      shorten the synchronization timeout period in response to a number of beacon requests received by the node being larger than a number of beacon requests being sent by the node in a same time period; or
      lengthen the synchronization timeout period in response to a number of beacon requests received by the node being smaller than a number of beacon requests being sent by the node; and
   a leaf-classification function, defined in the memory and executable by the processor, and configured for:
      measuring a leaf-indicating period of time using the clock;
      determining when a beacon request arrived at the node during the leaf-indicating period of time; and
      classifying the node as a parent node or a leaf node based on the determination.

10. The node as recited in claim 9, wherein a duration of the synchronization timeout period of the node is based in part on randomization.

11. The node as recited in claim 9, additionally comprising:
   a radio, in communication with the processor and configured for:
      sending beacon requests in response to the beacon request function;
      receiving beacons in response to the beacon requests; and
      performing a frequency hopping function.

12. A method of operating a node, comprising:
   timing a leaf-indicating period of time on a clock;
   listening for a beacon request during the leaf-indicating period of time, the listening including reception of radio frequency (RF) signals on a control channel defined in a mesh network;
   determining when a beacon request has been received from a child node of the node, during the leaf-indicating period of time;
   classifying the node as a leaf node when the node has not received a beacon request within the leaf-indicating period of time; and
   timing a synchronization timeout period on the clock, wherein a duration of the synchronization timeout period is set at least in part as a function of:
      a number of beacon requests received over a period of time; and
      a number of beacon requests sent over the period of time.

13. The method as recited in claim 12, additionally comprising:

when a beacon is received prior to expiration of the synchronization timeout period then resetting the synchronization timeout period;

when a beacon is not received prior to expiration of the synchronization timeout period then:

sending a beacon request;

receiving a beacon in response to the beacon request; and resetting the synchronization timeout period;

updating the clock according to a time indicator within the received beacon.

14. The method as recited in claim 12, additionally comprising:

receiving a second beacon request from a second node;

configuring a second beacon with a time indicator based on the clock; and sending the second beacon to the second node.

15. The method as recited in claim 12, additionally comprising:

setting a duration of the synchronization timeout period of the node to be shorter than synchronization timeout periods of nodes that are further from the cellular router than the node.

16. The method as recited in claim 12, additionally comprising:

setting a duration of the synchronization timeout period of the node to be longer than synchronization timeout periods of nodes that are fewer hops from the cellular router than the node.

17. The method as recited in claim 12, additionally comprising:

setting a duration of the synchronization timeout period of the node based in part on a number of hops from the cellular router.

18. The method as recited in claim 12, wherein a duration of the synchronization timeout period of the node is adjusted to reduce network traffic.

* * * * *